Div. A.

4,503.

JOHN E. EARLE.

Improvement in Clothes Frame.

Reissued August 8, 1871.

John E. Earle
Inventor

Witnesses.

John H. Shumway

A. J. Tibbits

AM. PHOTO-LITHOGRAPHIC CO. N.Y. (OSBORNE'S PROCESS.)

UNITED STATES PATENT OFFICE.

JOHN E. EARLE, OF NEW HAVEN, CONNECTICUT, ASSIGNOR, BY MESNE ASSIGNMENTS, TO PETER R. CARLL, OF SAME PLACE.

IMPROVEMENT IN CLOTHES-FRAMES.

Specification forming part of Letters Patent No. 36,994, dated November 25, 1862; reissue No. 4,503, dated August 8, 1871.

DIVISION A.

*To all whom it may concern:*

Be it known that I, JOHN E. EARLE, of New Haven, in the county of New Haven and State of Connecticut, have invented a new Improvement in Clothes-Frame; and I do hereby declare the following, when taken in connection with the accompanying drawing and the letters of reference marked thereon, to be a full, clear, and exact description of the same, and which said drawing constitutes part of this specification, and represents, in—

Figure 1:
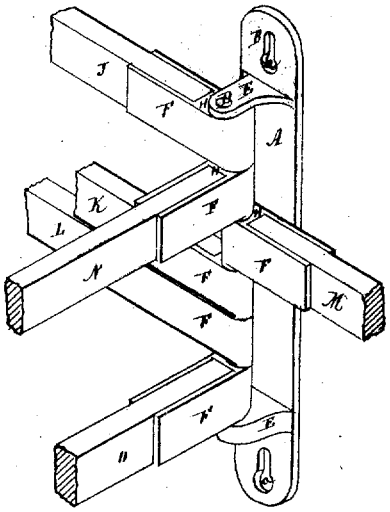
Figure 2:
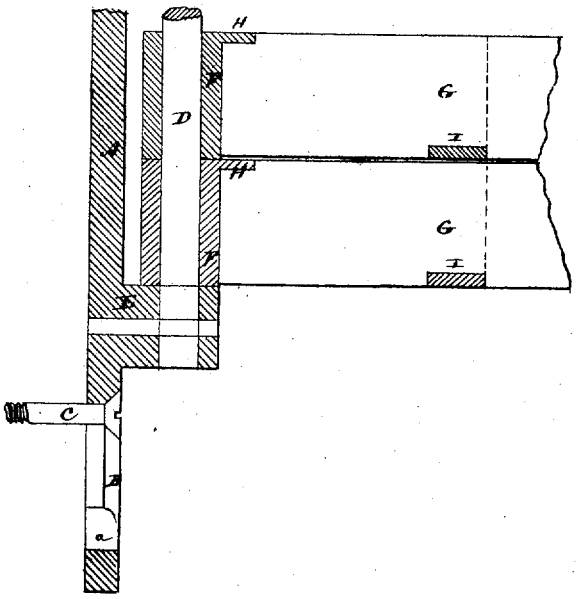
Figure 4:
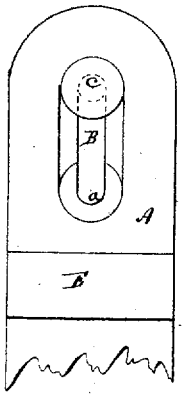
Figure 3:
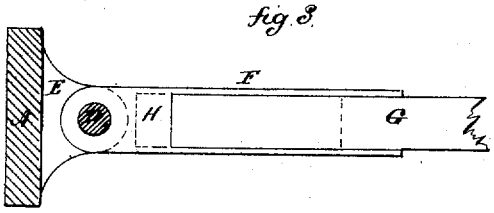

Figure 1 a perspective view, and in Figs. 2, 3, and 4 detached parts of the same.

This invention relates to a device for drying or airing clothes, commonly called clothes-bars or frames, but applicable for other purposes; the object being the construction of a device so that it may be attached to the wall of a house or other convenient or desired position; and the invention consists in the arrangement of several bars, one above the other, upon a vertical pintle or rod, the said rod supported in a bracket, and the bars free to swing to the right or left, the bracket constructed with a slot or slots to set over and hang upon a headed device on the wall, or wherever it is desired to secure the frame.

A is the bracket, usually constructed from metal, with ears E E projecting therefrom, and between which extends the rod or pintle D. The bracket is constructed with a slot, B, at the top, the lower end of the slot enlarged, so that the bracket may be set over the head C of a screw and dropped down, the edges of the slot passing down back of the head, as seen in Figs. 2 and 4, to hold the bracket in position; and I prefer to make a similar slot at the bottom of the bracket. To secure the bracket to the wall, or wherever it may be desired, a screw or other headed device is inserted or fixed to the wall so as to pass through the slot and allow the bracket to drop down onto the body of the screw. To the rod or pintle D the several bars are attached so as to swing to the right or left, the pintle D forming the turning point for the several bars, and when in position should be vertical, or as near so as may be. For long bars, as for the drying of clothes, I arrange sockets F, which are formed of metal, into which the bars G are inserted; a lug, H, upon the inner end, at the top, and a cross-bar, I, below, serve to support their respective bars G in proper position, as seen in Fig. 2. As represented in Fig. 1, the bars J K L are turned to the extreme left, the bar M to the extreme right, and the remaining bars N O turned out as for use, and may be one over the other, or, radiating from the bracket, either or all of the bars may be turned at any point from one extreme to the other. For small bars, or for light purposes, the sockets themselves may be constructed of bar form for the support of articles to be hung thereon.

I claim as my invention—

1. A clothes-frame or bars, in which the bars are arranged one above another upon a vertical rod or pintle, and so as to swing freely therein, the said pintle supported in a bracket, and the said bracket constructed with a slot or slots to set over a headed device to secure the said bracket in position, substantially as specified.

2. The sockets F, more or less in number, arranged upon a vertical rod or pintle supported in a bracket, when the said sockets are constructed substantially as described, for the insertion and support of the bars.

JOHN E. EARLE.

Witnesses:
A. J. TIBBITS,
J. H. SHUMWAY.